United States Patent

Takahashi et al.

[11] Patent Number: 6,046,856
[45] Date of Patent: Apr. 4, 2000

[54] IMAGE PROJECTOR AND ILLUMINATION DEVICE USED FOR THE IMAGE PROJECTOR

[75] Inventors: Ryusaku Takahashi; Tatsuru Kobayashi, both of Yokosuka, Japan

[73] Assignee: Victor Company of Japan, Ltd., Yokohama, Japan

[21] Appl. No.: 09/208,503

[22] Filed: Dec. 9, 1998

[30] Foreign Application Priority Data

Dec. 11, 1997 [JP] Japan .................................... 9-361630

[51] Int. Cl.[7] .................................................. G02B 27/10
[52] U.S. Cl. .......................... 359/621; 359/618; 359/630; 359/558; 359/15; 349/5; 349/95; 349/201; 362/268
[58] Field of Search ..................... 359/563, 621, 359/622, 618, 619, 630, 15, 19, 24, 31, 558; 362/268, 347; 349/5, 9, 10, 95, 201; 348/766

[56] References Cited

U.S. PATENT DOCUMENTS

| | | | |
|---|---|---|---|
| 3,773,401 | 11/1973 | Douklias et al. | 359/19 |
| 3,785,736 | 1/1974 | Spitz et al. | 359/15 |
| 3,993,398 | 11/1976 | Noguchi et al. | 359/24 |
| 5,594,526 | 1/1997 | Mori et al. | 359/619 |
| 5,633,737 | 5/1997 | Tanaka et al. | 349/95 |
| 5,715,089 | 2/1998 | Shiraishi | 359/558 |
| 5,719,704 | 2/1998 | Shiraishi et al. | 359/558 |
| 5,719,706 | 2/1998 | Masumoto et al. | 359/622 |
| 5,745,294 | 4/1998 | Kudo | 359/618 |
| 5,796,521 | 8/1998 | Kahlert et al. | 359/619 |
| 5,973,840 | 10/1999 | Itoh et al. | 359/618 |

FOREIGN PATENT DOCUMENTS

| | | |
|---|---|---|
| 7-120753 | 5/1995 | Japan . |
| 9-146064 | 6/1997 | Japan . |
| 9-189809 | 7/1997 | Japan . |

*Primary Examiner*—Loha Ben
*Attorney, Agent, or Firm*—Eugene Lieberstein; Michael N. Meller

[57] ABSTRACT

In an illumination device used for a color image projector, indefinitely polarized light beams from a light source are separated by a polarization beam splitter into two linearly polarized light beams respectively having polarized planes perpendicularly intersecting to each other. One of the two polarized light beams is made to have the same polarized plane as that of the other by a ½λ wave-plate. Second and third lens arrays are respectively placed at positions where an optical distance from a first lens array to the second lens array is the same as that from the first lens array to the third lens array. Principal rays of luminous fluxes outputted from microlenses of the second and third lens arrays are made to be parallel to each other and to a superimposing lens. The illumination light outputted from the superimposing lens illuminates a display device in a telecentric optical system using optically a visual field lens. The illumination light has a large cone angle in a diffraction direction of a hologram color filter provided on an LCD display device compared with that in a direction perpendicular to the diffraction direction.

5 Claims, 6 Drawing Sheets

IMAGE PROJECTOR AND ILLUMINATION DEVICE USED FOR THE IMAGE PROJECTOR

BACKGROUND OF THE INVENTION

1. Field of the Invention

The present invention relates to an image projector and an illumination device used for the image projector.

2. Description of the Related Art

Recently, there have been put to practical use various kinds of electronic color imaging systems such as a self-emission color imaging system, a cathod ray tube (CRT) color imaging system and a color imaging system employing a liquid crystal display device as a light valve.

These various kinds of electronic color imaging systems are used for providing people with various kinds of information, for instance, community information in major cities, information for passersby on the street, information in base ball stadiums and race tracks, and for information in the place of an event.

Among the above color imaging systems, there comes to be widely used a color image projector (a projection type color image display apparatus),employing a liquid crystal display device as the light valve, wherein an active matrix liquid crystal display device is employed as a light modulation member.

As the active matrix liquid crystal display device, there are well known two types, a transmission type and a reflection type. In the image projector, priority is given to high luminance and contrast ratio of a displayed image.

The transmission type active matrix liquid crystal display device has a plurality of picture cells being two-dimensionally aligned and light shielding members such as black matrix or black stripes are provided between the cells to enhance picture quality. Cell controlling elements such as thin-film transistors for individually controlling a degree of light passing through the picture cells are provided close to the picture cell. These controlling elements and further provided data signal bus lines and scanning bus lines for driving the transmission active matrix liquid crystal display device are not light transmissive.

Thus, in the transmission type active matrix liquid crystal display device, not all the light beams impinging on the liquid crystal display device are utilized used for displaying an image but a part of them. Therefore, a vignetting (opening) factor defined as a ratio of a quantity of light outputted from a unit picture cell to a quantity of light inputted on its entire picture cell domain is naturally decreased when a number of the picture cells is increased for a given total area of the transmission type active matrix liquid crystal display.

Accordingly, when a high definition picture obtained by increasing the number of picture cells is intended to be displayed with a high luminance, it requires a high intensity of light to illuminate the transmission active matrix liquid crystal display device.

Generally, a liquid crystal used in the liquid crystal display device is not a lyotropic liquid crystal in which a liquid crystal phase appears due to an effect of a solvent, but a thermotropic liquid crystal in which the liquid crystal phase appears in a specific temperature range. The liquid crystal transforms its phase among a crystal phase, a liquid crystal phase and a liquid phase responsive to a temperature. Accordingly, upon irradiation of the incident light beam it is necessary to keep an operative temperature of the liquid crystal display device, which is limited to a certain range.

As mentioned in the foregoing, the vignetting factor is not 100%. Thus, a part of the incident light beam which is not used to display the image, results in a temperature rise of the liquid crystal display device. This fact suggests that it is not always possible or effective to employ a high power source only to obtain a high luminance picture.

Therefore, in the transmission type active matrix crystal liquid display device, there are devised various kinds of countermeasures for increasing the vignetting factor thereof.

On the other hand, in the aforementioned reflection type active matrix liquid crystal display device, there are no light blocking members in the projection light path, such as the thin-film transistors for controlling a quantity of light at every picture cell, the signal bus lines and the scanning bus lines, resulting in the vignetting factor of 100%. This feature is considered to be more advantageous than that of the transmission type display element from the view point of easily obtaining the display image having a high luminance.

Incidentally, as the color image projector employing the light valves, there are two types, a three-plate type color image projector composed of three light valves, each for displaying a primary color image in the additive primaries, and a single-plate type color image projector composed of a light valve with color filters, wherein an image of tri-color primaries is displayed on the light valve driven by a dot or line sequential tri-color signal, and the color filters are disposed so as to produce respective color image of the primaries from the light valve. Each filter has a certain wavelength range corresponding to a certain primary color image.

In the three-plate type color image projector, it requires a tri-color separation optical system and a tri-color composition optical system, inevitably resulting in a largesized projector. On the contrary, the single-plate color image projector has an advantage capable of downsizing the image projector.

Accordingly, there has received much attention the color image display apparatus employing a reflection type active matrix crystal liquid display device as a light valve because of merits of both readily obtaining a high luminance display image and downsizing the apparatus.

However, in order to obtain a high luminance display color image, it is necessary to produce high intensity light beams of primary colors having corresponding wavelength ranges, and each of the light beams having a specific lineally polarized plane. The high intensity light beams should precisely impinge on corresponding tri-color picture cells disposed in a predetermined matrix form on the light valve for spatially modulating the respective incident light beams.

Thus, as the color filter used with the reflection type active matrix liquid crystal display device, it is desirable to employ one capable of performing a thermally stable operation even when the incident light beam impinges thereon with a high intensity.

As such a color filter as satisfying the abovementioned condition, it is preferable to employ a hologram color filter capable of converging the incident light beams on the cells at different angles of diffraction individually for different colors, for instance, as disclosed in the Japanese Patent Laid-open Publication No. 9-189809.

However, in order to cause the hologram color filter to perform a predetermined good diffraction or spectrum-filterring (referred to as diffraction/spectrum-filterring) operation, it is preferable to cause the incident light beams to impinge on the hologram color filter approximately at an incident angle of 60°.

As mentioned in the foregoing, when a polarized light beam (S-polarized light beam) oscillating in a direction perpendicular to a plane of incidence with respect to the hologram color filter impinges on the hologram color filter at an incident angle of 60°, an oscillation direction of a luminous flux having a cone angle of 0° is perpendicular to the plane of the incidence with respect to the hologram color filter.

However, when an oscillation direction of the luminous flux having a cone angle of more than 0°, the oscillation direction of the luminous flux is inclined against that of the luminous flux having the cone angle of 0° because the oscillation direction of the polarized light beam is always perpendicular to a propagation direction of the luminous flux.

Thus, it will be understood that the oscillation direction of the luminous flux having the cone angle other than 0° is no longer an S-polarized light with respect to the hologram color filter.

Therefore, in the image projector employing the liquid crystal display device where the aforementioned incident light impinges on the hologram color filter, projecting a high contrast ratio display image on the screen can not be expected.

SUMMARY OF THE INVENTION

Accordingly, a general object of the present invention is to provide an image projector and an illumination device used in the image projector, where the above disadvantages have been eliminated.

A specific object of the present invention is to provide an illumination device used in the color image projector capable of generating an illuminating light beam for displaying a color image on the screen without loss by causing the luminous flux of the illuminating light beam to have a small cone angle in a direction perpendicular to a direction of a diffraction/spectrum-filterring operation of the hologram color filter and to have a large cone angle in a direction of the diffraction/spectrum-filterring operation of the hologram color filter.

A more specific object of the present invention is to provide an illumination device used for an image projector, the illumination device having a light source for generating an indefinitely polarized light beam, polarization separation means for separating the indefinitely polarized light beam into two differently and linearly polarized light beams of which polarized planes are perpendicular to each other, a ½λ wave-plate for equalizing one of the polarized planes of the two differently and linearly polarized light beams to another polarized plane thereof, optical path alterring means for alterring a direction of principal ray of one of the two differently and linearly polarized light beams; and a superimposing lens for superimposing two equally and linearly polarized light beams obtained from the two differently and linearly polarized light beams, the illumination device comprising: a first microlens array provided between the light source and the polarization separation means, the first microlens array being composed of a plurality of microlens units; a second microlens array provided in a first optical path of one of the two equally and linearly polarized light beams between the polarization separation means and the superimposing lens, the second microlens array being composed of a plurality of microlens units; a third microlens array provided in a second optical path of another of the two equally and linearly polarized light beams between the polarization separation means and the superimposing lens, the third microlens array being composed of a plurality of microlens units, wherein the second microlens array in the first optical path and the third microlens array in the second optical path are placed to have an approximately same optical distance referred to a position of the first microlens array; and means for aligning principal rays of the two equally and linearly polarized light beams to be parallel to each other.

Another and specific object of the present invention is to provide an image projector comprising a reflection type liquid crystal display device equipped with a hologram color filter for performing a diffraction/spectrum-filterring operation of additive primary colors, an illumination system for illuminating the reflection type liquid crystal display device through the hologram color filter, and a projection system for projecting an image on a screen using illumination light beams from the illumination system, the illumination system being intensity-modulated by image display information driving the reflection type liquid crystal display device and means for changing cone angles of the illumination light beams, whereby a cone angle of the illumination light beams in a direction perpendicular to a direction of the diffraction/spectrum-filterring operation of the hologram color filter is made to be smaller than a cone angle in the direction of the diffraction/spectrum-filterring operation by using the means for changing cone angles of the illumination light beams.

Further and specific object of the present invention is to provide an image projector comprising: an illumination device having, at least, a light source for generating an indefinitely polarized light beam, polarization separation means for separating the indefinitely polarized light beams into two differently and linearly polarized light beams of which polarized planes are perpendicular to each other, a ½λ wave-plate for equalizing one of the polarized planes of the two differently and linearly polarized light beams to another polarized plane thereof, optical path alterring means for alterring a direction of principal ray of one of the two differently and linearly polarized light beams, and a superimposing lens for superimposing two equally and linearly polarized light beams obtained from the two differently and linearly polarized light beams, wherein the illumination device further comprises a first microlens array provided between the light source and the polarization separation means, the first microlens array being composed of a plurality of microlens units, a second microlens array provided in a first optical path of one of the two equally linearly polarized light beams between the polarization separation means and the superimposing lens, the second microlens array being composed of a plurality of microlens units, a third microlens array provided in a second optical path of another of the two equally and linearly polarized light beams between the polarization separation means and the superimposing lens, the third microlens array being composed of a plurality of microlens units, wherein the second microlens array in the first optical path and the third microlens array in the second optical path are placed to have an approximately same optical distance referred to a position of the first microlens array; and means for aligning principal rays of the two equally and linearly polarized light beams to be parallel to each other; a reflection type liquid crystal display device equipped with a hologram color filter for performing a diffraction/spectrum-filterring operation of additive primary colors; and a projection system for projecting an image on a screen by using illumination light beams generated by the illumination system, the illumination light beams being intensity-modulated with image information driving the reflection liquid crystal display device.

DETAILED DESCRIPTION OF THE PREFERRED EMBODIMENTS

Next, a description is specifically given of a color image projector and an illumination device used in the color image projector in conjunction with drawings.

Figure 1:
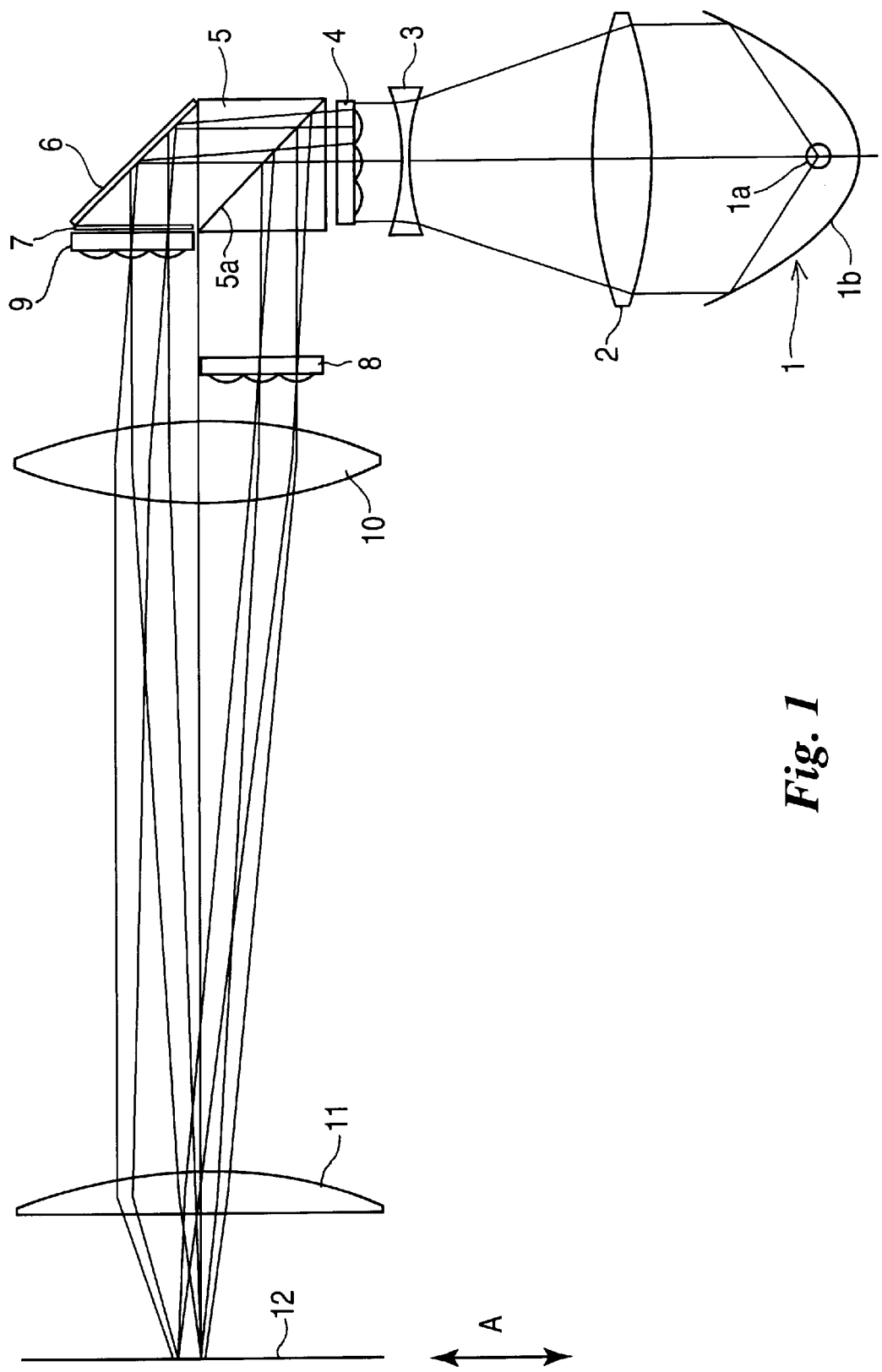
FIG. 1 is a block diagram showing an outline of an embodiment of an illumination device used in a color image projector of the present invention.
Figure 2:
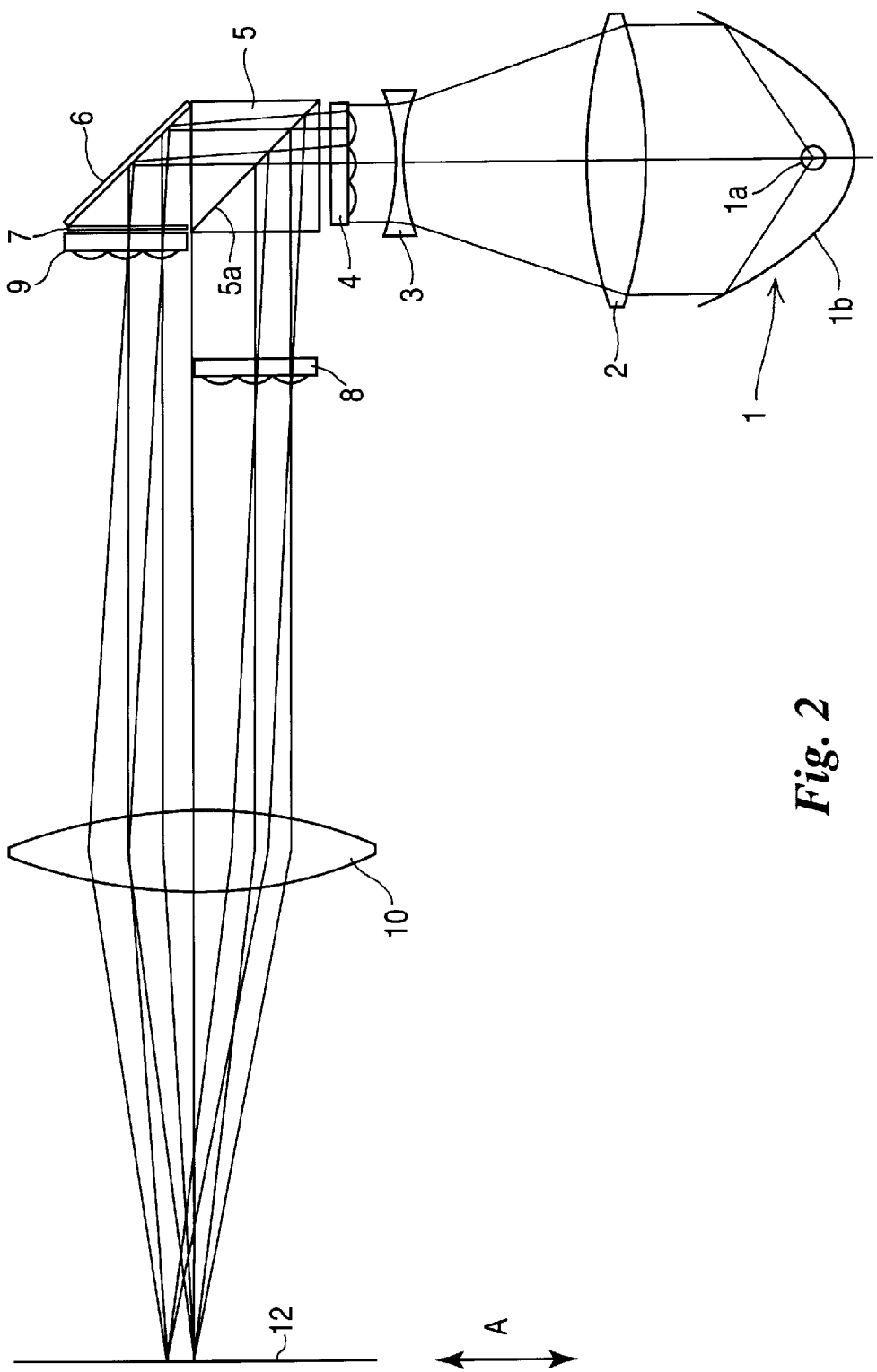
FIG. 2 is a block diagram showing an outline of another embodiment of the illumination device used in the color image projector.
Figure 3:
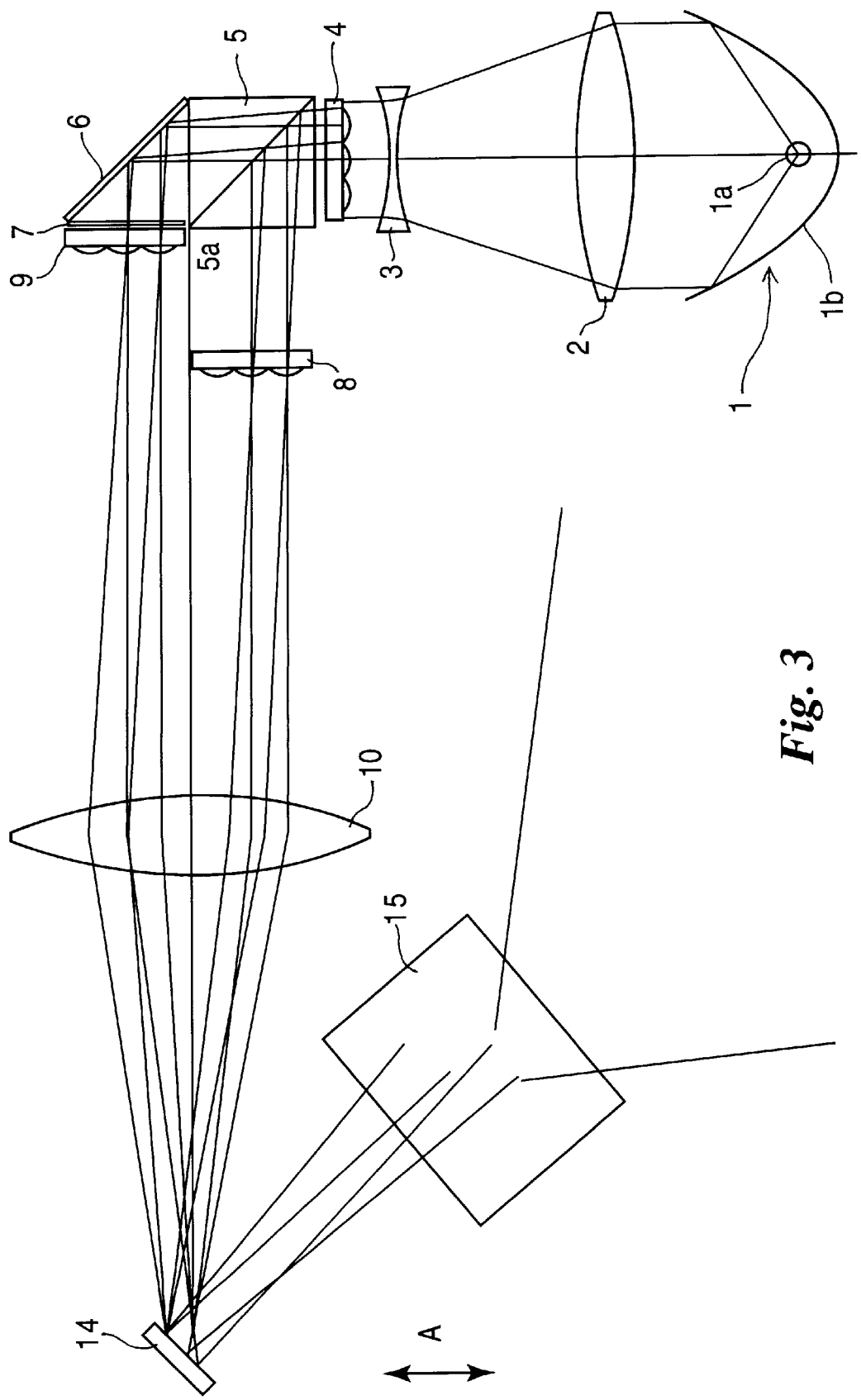
FIG. 3 is a block diagram showing an outline of an embodiment of a color image projector of the present invention.
Figure 4:
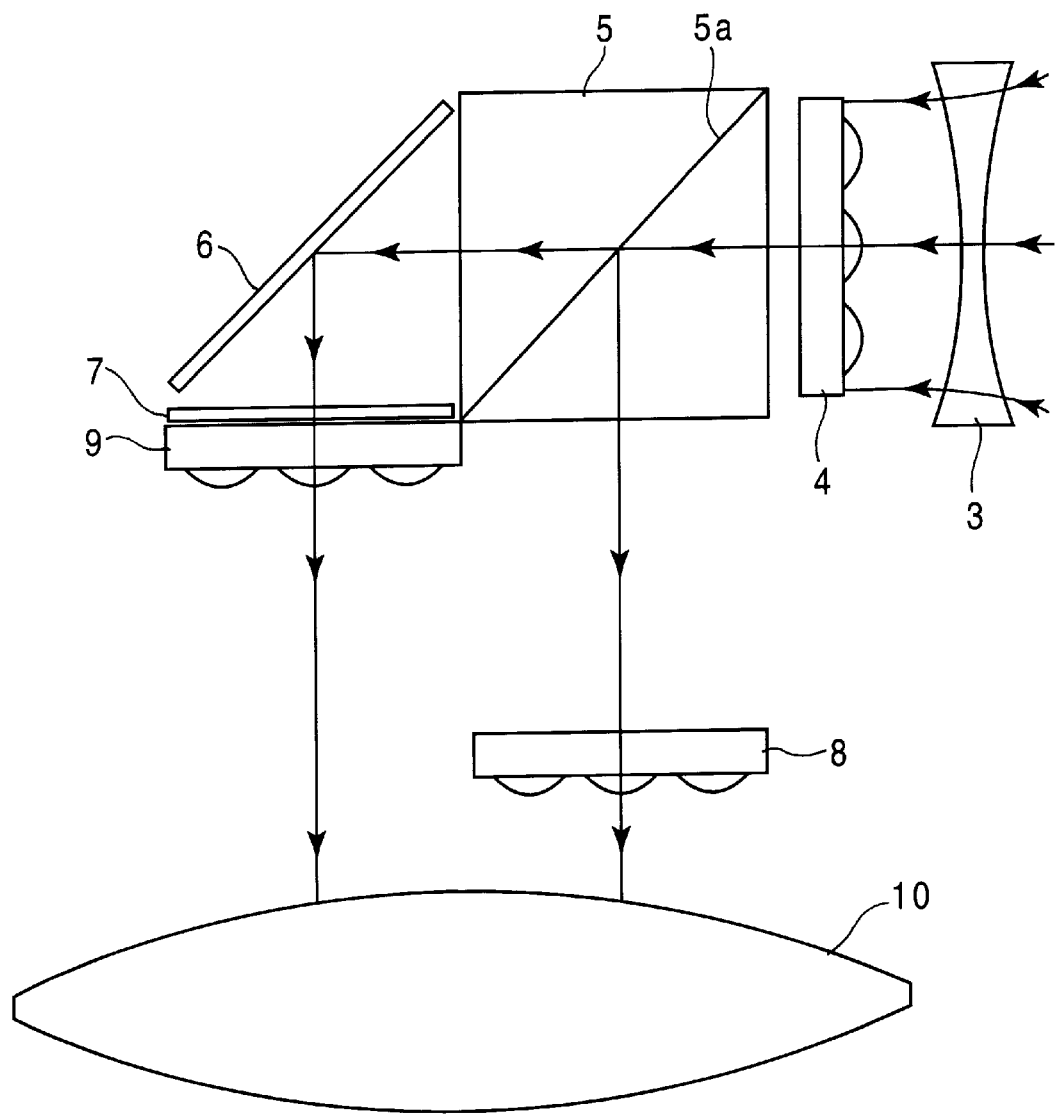
FIG. 4 is a block diagram showing a part of the illumination device shown in FIGS. 1 and 2.
Figure 5:
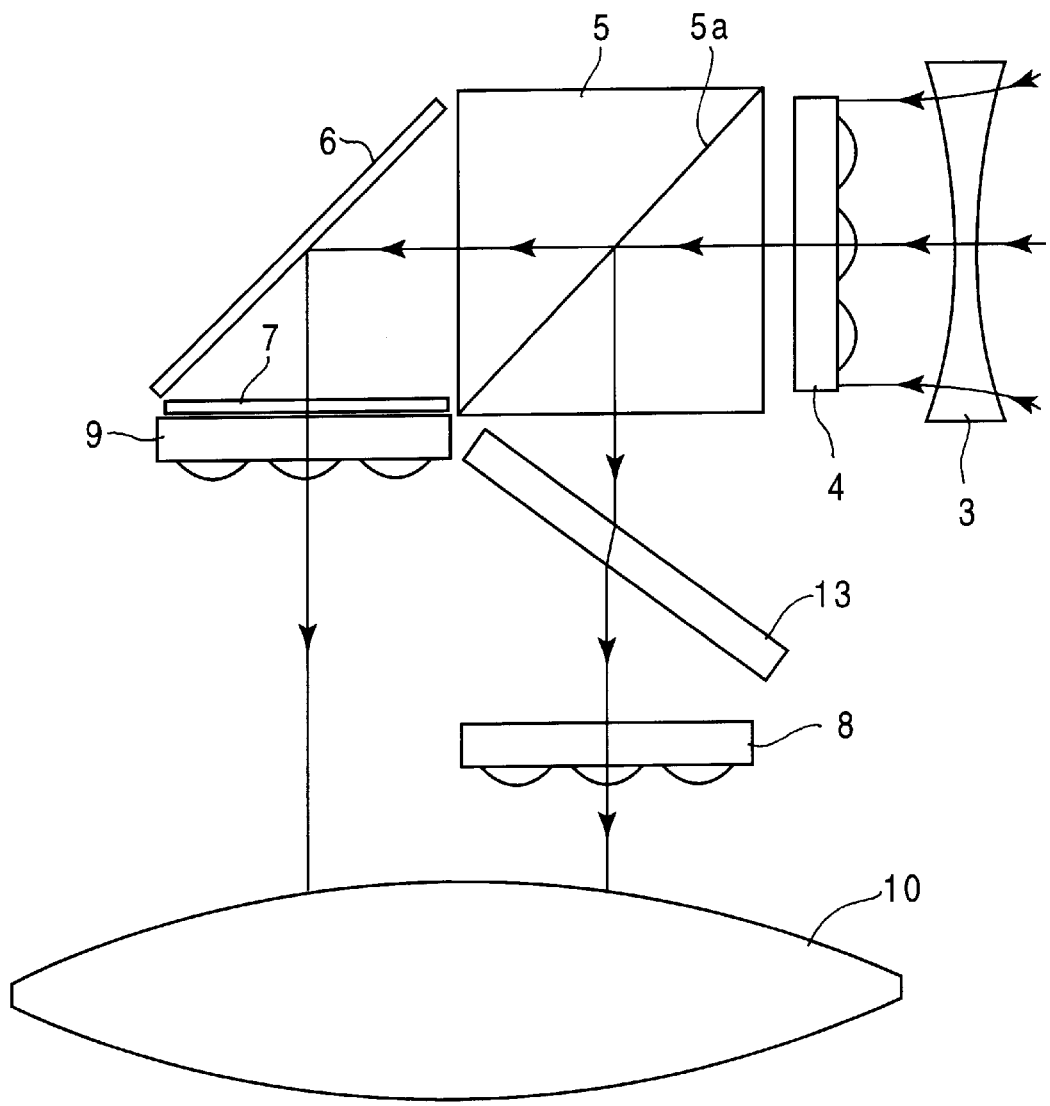
FIG. 5 is a block diagram showing a part of a modification of the illumination device shown in FIG. 4.
Figure 6:
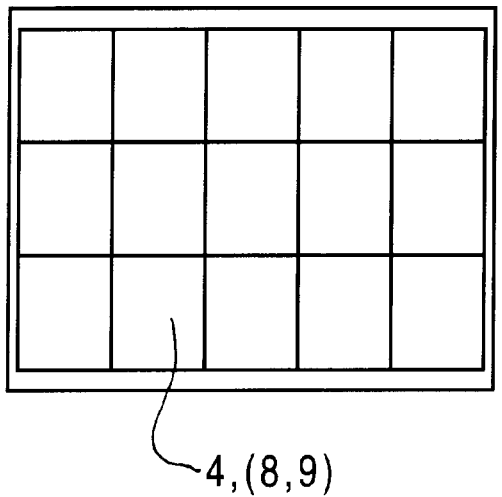
FIG. 6 is a plan view showing a disposition of ommatidia used in first, second and third lens arrays in an embodiment of the illumination device of the present invention.
Figure 7:
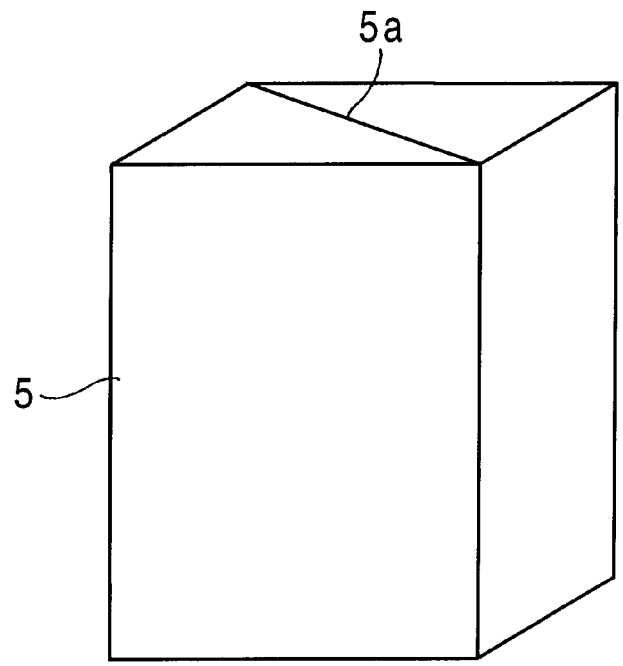
FIG. 7 is a perspective view showing a polarization beam splitter used in the present invention.

FIG. 1 is a block diagram showing an outline of an embodiment of an illumination device used in a color image projector of the present invention;

FIG. 2 is a block diagram showing an outline of another embodiment of the illumination device used in the color image projector;

FIG. 3 is a block diagram showing an outline of an embodiment of a color image projector of the present invention;

FIG. 4 is a block diagram showing a part of the illumination device shown in FIGS. 1 and 2;

FIG. 5 is a block diagram showing a part of a modification of the illumination device shown in FIG. 4;

FIG. 6 is a plan view showing a disposition of ommatidia used in first, second and third lens arrays in an embodiment of the illumination device of the present invention; and FIG. 7 is a perspective view showing a polarization beam splitter used in the present invention.

In FIGS. 1 to 3, a reference character 1 designates a light source device for generating an indefinitely polarized light beam, 1a a light source (for instance, a discharge lamp or incandescent (electric) lamp), 1b a reflection mirror, 2 a condenser lens, 3 a collimator lens for making the light beams from the condenser lens 2 to be parallel.

Reference character 4 designates a first lens array, 8 a second lens array, and 9 a third lens array. The first, second and third lens arrays 4, 8, 9 are so called fly's eye lens plates (compound lens plates). Each of the first, second and third lens arrays 4, 8, 9 is composed of a plurality of ommatidia (microlens units) disposed in a predetermined pattern shown in FIG. 6.

For each of the ommatidia used in the first, second and third lens arrays 4, 8, 9, there is used an ommatidium (microlens unit) having a similar shape to that of an objective area to be illuminated (referred to as an objective illumination area) by an illumination luminous flux.

Specifically, when the objective illumination area has a rectangular shape of a certain aspect ratio, there is used an ommatidium having such a rectangular shape with the same aspect ratio as that of the objective illumination area.

The first and second lens arrays 4, 8 form a first optical integrator, and the first and third lens arrays 4, 9 form a second optical integrator. The second and third lens arrays 8, 9 are respectively placed at positions so as to have an equal distance to each other measured from the first lens array 4.

In an optical path between the first and second lens arrays 4, 8 of the first optical integrator, there is placed a polarization beam splitter 5, and in an optical path between the first and third lens arrays 4, 9 of the second optical integrator there are provided the polarization beam splitter 5, a total reflection mirror 6 for alterring a path of the light beam and a ½λ wave-plate 7.

Thus, each of the ommatidia of the first lens array 4 converges its inputted illumination light beam on a corresponding one ommatidia of the second and third lens arrays 8, 9. Thereby, principal rays of the luminous flux outputted from the respective ommatidia of the second lens array 8 are aligned to be parallel to each other, similarly principal rays of the luminous flux outputted from the ommatidia of the third lens array 9 are aligned to be parallel to each other.

The indefinitely polarized light beams outputted from the ommatidia of the first lens array 4 impinge on the polarizing beam splitter 5, where the light beams reflected at right angles by a polarizing separation film 5a of the polarizing beam splitter 5 become s-polarized light beams (a polarized light component having an electrical vector oscillating in a plane perpendicular to an incident plane) and the light beams passing through the polarizing separation film 5a become p-polarized light beams (a polarized light component having an electrical vector oscillating in a plane parallel to an incident plane).

On the second lens array 8, there impinge the s-polarized light beams, and on the third lens array 9, there also impinge s-polarized light beams which are obtained from the abovementioned p-polarized light beams by rotating the polarization plane thereof by 90° with the ½λ wave-plate 7 after reflected by the total reflection mirror 6.

Therefore, the luminous fluxes of indefinitely polarized light beams generated from the light source device 1 are polarized in a high efficiency as illumination light beams having predetermined polarized plane (s-polarized) and impinge on the second and third lens arrays 8, 9, respectively.

The luminous fluxes of s-polarized light emitted from the respective ommatidia of the second and third lens arrays 8, 9, of which principal rays are parallel to each other, are made to be incident on a superimposing lens 10. The superimposing lens 10 has a function of superimposing the luminous fluxes outputted from the ommatidia thereof on the objective illumination area 12.

The s-polarized light beams from the superimposing lens 10 are made to be incident on a visual field lens 11 as shown in FIG. 1. The visual field lens 11 has a function of illuminating the objective illumination area 12 with the superimposed luminous fluxes of which principal rays are maintained parallel to each other.

Incidentally, when illuminating the objective illumination area by using the p-polarized light, the ½λ wave-plate 7 is to be placed nearby the second lens array 8.

In the illumination device shown in FIGS. 2 and 3, the visual field lens 11 is not provided. This suggests that when the principal rays of the luminous fluxes emitted from the respective ommatidia of the second and third lens arrays 8, 9 are preliminarily aligned to be parallel to each other after passing through the superimposing lens 10, there is not necessary to provide the visual field lens 11. In other words, by introducing forming a telecentric optical system into the illumination device of the present invention, it is possible to omit the visual field lens 11. Such a telecentric optical system may be formed by the optical members composed of from the collimator lens 3 up to the superimposing lens 10.

In the illumination device, wherein the description is given of that a parallel light beam can be inputted to the first lens array 4 from the collimator lens 3, the principal rays of the luminous fluxes outputted from the ommatidia of the second and third lens arrays 8, 9 can be made to be parallel by employing an identical construction lens array for the first, second and third lens arrays 4, 8, 9.

However, it should be noted that the further provision of the visual field lens 11 may allow a better telecentric optical performance for illuminating the objective illumination area 12 as shown in FIG. 1.

Next, when the luminous fluxes inputted to the first lens array 4 from the collimator lens 3 are convergent or divergent, a size of each ommatidium used in the first lens array 4 is made to be different from those used in the second and third lens array 8, 9, however, the number and the layout condition of the ommatidia used in the second and third lens arrays 8, 9 are maintained same as those of the first lens array 4.

For instance, when the luminous fluxes inputted to the first lens array 4 are convergent, the size of each ommatidium of the second and third lens arrays 8, 9 may be made to be smaller than that of the first lens array 4. When the luminous fluxes inputted to the first lens array 4 are divergent, the size of each ommatidium of the second and third lens arrays 8, 9 is made to be larger than that of the second and third lens arrays 8, 9.

However, the size of each ommatidium of the second lens array 8 is the same as that of the third lens array 9 even when the luminous fluxes inputted to the first lens array 4 is convergent or divergent.

When the luminous fluxes inputted to the first lens array 4 are convergent or divergent, principal rays of the luminous fluxes outputted from the ommatidia of the second and third lens arrays 8, 9 are not parallel to each other. Therefore, in this case the visual field lens 11 is preferably employed to allow the illumination device to be the telecentric optical system for illuminating the objective illumination area 12.

In the illumination device of the present invention constructed as mentioned in the foregoing, the illumination light outputted from the first lens array 4 is inputted to the second and third lens arrays 8, 9 disposed above and below in FIGS. 1 to 3, and all the light beams outputted from the ommatidia of the second and third lens arrays 8, 9 are superimposed on the objective illumination area 12.

Thus, a brightness (F number) on the objective illumination area 12 along a direction shown with a double-headed arrow A in FIGS. 1 to 3 is higher compared with that along a direction perpendicular to the surface of the drawing.

Further, the luminous fluxes incident on the objective illumination area 12 of a rectangular shape having an aspect ratio similar to that of each ommatidium have a larger cone angle in a lateral direction (vertical to the surface of the drawing) of the rectangular shape than that in a vertical direction (double-headed arrow) thereof.

Incidentally, when the superimposing lens 10 has a spherical aberration, the principal rays of the luminous fluxes outputted from the superimposing lens 10 become non-parallel to each other even when the luminous fluxes outputted from the respective ommatidia of the second and third lens arrays 8, 9 enter the superimposing lens 10 in parallel to each other.

As a result, image forming points of the ommatidia of the second and third lens arrays 8, 9 are displaced from the objective illumination area 12 due to the aberration.

However, the problem of the imagery deviation can be corrected by shifting optical axes of those ommatidia which cause the imagery deviation, or by increasing a distance from the superimposing lens 10 to the second and third lens arrays 8, 9. It is also effective for solving the problem to employ a Fresnel lens as the superimposing lens 10.

As mentioned in the foregoing, the luminous fluxes irradiating the objective illumination area 12 having a rectangular shape of a certain aspect ratio similar to that of each ommatidium used in the second and third lens arrays 8, 9 have small cone angles in the vertical direction (double-headed arrow A) of the rectangular shape compared with that in the lateral direction thereof.

When a much smaller cone angle of the luminous fluxes in the vertical direction thereof is required, it is effective to shift the respective optical axes of the second and third lens arrays 8, 9 closer to the optical axis of the superimposing lens 10.

As shown in FIG. 4, as a specific countermeasure to bring the luminous fluxes outputted from the second and third lens arrays 8, 9 to come closer to the axis of the superimposing lens 10, the total reflection mirror 6 is placed at a lower position from the position shown in FIGS. 1 to 3 so that a center of the total reflection mirror 6 comes closer to the optical axis of the superimposing lens 10, or as shown in FIG. 5, there may be placed an optical member 13 on a way of an optical path between the polarization beam splitter 5 and the second lens array 8 for allowing the separation center of the polarized beam splitter 5 to come closer to the optical axis of the superimposing lens 10.

Next, the description is given of the color image projector referring to FIG. 3, wherein the illumination light outputted from the abovementioned illumination device is inputted to a reflection active matrix liquid crystal dispaly device (referred to as liquid crystal display device) 14 having a hologram color filter (not shown) for spectrally separating the illumination light, and the luminous flux intensity-modulated by the image information displayed on the liquid crystal display device 14 is projected as a display image on the screen by a projection lens 15.

The liquid crystal display device 14 is driven by a dot sequential color image signal supplied from a driving circuit (not shown).

On the other hand, the hologram color filter is illuminated by a telecentric irradiation with a large quantity of the luminous flux having a specific polarized plane with a small cone angle in a predetermined direction (in a direction perpendicular to a direction of the diffraction/spectrum-filterring operation of the hologram color filter). Thus, the hologram color filter can precisely direct the linearly polarized light beams of respective colors separated as diffraction to the cells provided in a matrix form in corresponding colors of the additive primaries on the liquid crystal display device 14. As a result, it is possible to obtain an excellent display image with a high luminance on the screen without color impurity.

According to the aforementioned illumination device of the present invention, the illumination light outputted from the illumination device is inputted to a color image projector comprising a reflection active matrix liquid crystal display device equipped with a color filter for diffractively separating the illumination light into three color lights in the additive primaries and a projection optical system for projecting an image on the screen produced from luminous fluxes intensity-modulated by image information which drives a reflection type active matrix liquid crystal display device.

Thereby, it is possible to improve efficiency of light utilization by maintaining an approximately equal multiplication of imagery, and to improve a vignetting factor of the second and third lens arrays.

Furthermore, the illumination device is possible to provide an illumination light having a large cone angle in a direction of the diffraction/spectrum-filterring operation and a small cone angle in a direction perpendicular to the above direction to allow the hologram color filter to perform a good diffraction/spectrum-filterring operation without a loss, resulting in a dispaly image having a high contrast ratio.

Further, it is not necessary to provide a wavelength plate in a separated state, and possible to employ an identical construction as the first, second and third lens arrays, resulting in a cost down of the illumination device.

Further, it is possible to project a color image having a high luminance and contrast ratio by utilizing the illumination light outputted from the illumination device mentioned above, resulting in a solution of the problems mentioned in the prior art.

What is claimed is:

1. An illumination device used for an image projector, the illumination device having a light source for generating an indefinitely polarized light beam, polarization separation means for separating the indefinitely polarized light beam into two differently and linearly polarized light beams of which polarized planes are perpendicular to each other, a ½λ wave-plate for equalizing one of the polarized planes of the two differently and linearly polarized light beams to another polarized plane thereof, optical path alterring means for alterring a direction of principal ray of one of the two differently and linearly polarized light beams; and a superimposing lens for superimposing two equally and linearly polarized light beams obtained from the two differently and linearly polarized light beams, the illumination device comprising:

a first microlens array provided between the light source and the polarization separation means, the first microlens array being composed of a plurality of microlens units;

a second microlens array provided in a first optical path of one of the two equally and linearly polarized light beams between the polarization separation means and the superimposing lens, the second microlens array being composed of a plurality of microlens units;

a third microlens array provided in a second optical path of another of the two equally and linearly polarized light beams between the polarization separation means and the superimposing lens, the third microlens array being composed of a plurality of microlens units, wherein the second microlens array in the first optical path and the third microlens array in the second optical path are placed to have an approximately same optical distance referred to a position of the first microlens array; and means for aligning principal rays of the two equally and linearly polarized light beams to be parallel to each other.

2. An illumination device as claimed in claim 1, wherein the aligning means is a view field lens forming a telecentric optical system for the two equally and linearly polarized light beams outputted from the superimposing lens.

3. An illumination device as claimed in claim 1, wherein optical axes of respective microlens units disposed in the second and third lens arrays are shifted to each other so as to correct an imagery deviation of the light source caused by the superimposing lens when the superimposing lens has a spherical aberration.

4. An image projector comprising a reflection type liquid crystal display device equipped with a hologram color filter for performing a diffraction/spectrum-filterring operation of additive primary colors, an illumination system for illuminating the reflection type liquid crystal display device through the hologram color filter, and a projection system for projecting an image on a screen using illumination light beams from the illumination system, the illumination system being intensity-modulated by image display information driving the reflection type liquid crystal display device and means for changing cone angles of the illumination light beams, whereby a cone angle of the illumination light beams in a direction perpendicular to a direction of the diffraction/spectrum-filterring operation of the hologram color filter is made to be smaller than a cone angle in the direction of the diffraction/spectrum-filterring operation by using the means for changing cone angles of the illumination light beams.

5. An image projector comprising:

an illumination device having, at least, a light source for generating an indefinitely polarized light beam, polarization separation means for separating the indefinitely polarized light beams into two differently and linearly polarized light beams of which polarized planes are perpendicular to each other, a ½λ wave-plate for equalizing one of the polarized planes of the two differently and linearly polarized light beams to another polarized plane thereof, optical path alterring means for alterring a direction of principal ray of one of the two differently and linearly polarized light beams, and a superimposing lens for superimposing two equally and linearly polarized light beams obtained from the two differently and linearly polarized light beams, wherein the illumination device further comprises a first microlens array provided between the light source and the polarization separation means, the first microlens array being composed of a plurality of microlens units, a second microlens array provided in a first optical path of one of the two equally linearly polarized light beams between the polarization separation means and the superimposing lens, the second microlens array being composed of a plurality of microlens units, a third microlens array provided in a second optical path of another of the two equally and linearly polarized light beams between the polarization separation means and the superimposing lens, the third microlens array being composed of a plurality of microlens units, wherein the second microlens array in the first optical path and the third microlens array in the second optical path are placed to have an approximately same optical distance referred to a position of the first microlens array; and means for aligning principal rays of the two equally and linearly polarized light beams to be parallel to each other;

a reflection type liquid crystal display device equipped with a hologram color filter for performing a diffraction/spectrum-filterring operation of additive primary colors; and a projection system for projecting an image on a screen by using illumination light beams generated by the illumination system, the illumination light beams being intensity-modulated with image information driving the reflection liquid crystal display device.

* * * * *